United States Patent
Bol, II et al.

[11] Patent Number: 6,095,545
[45] Date of Patent: Aug. 1, 2000

[54] POSITIVE LOCK GOOSENECK HITCH

[75] Inventors: Kenneth E. Bol, II, Canton; Eric B. Michalak, Westland; Lynn S. Mida, Chelsea, all of Mich.

[73] Assignee: Draw-Tite, Inc., Canton, Mich.

[21] Appl. No.: 08/959,576

[22] Filed: Oct. 28, 1997

Related U.S. Application Data

[60] Provisional application No. 60/029,822, Oct. 28, 1996.

[51] Int. Cl.⁷ ...................................................... B60D 1/06
[52] U.S. Cl. ..................................... 280/491.1; 280/491.5
[58] Field of Search .............................. 280/491.1, 491.5, 280/901

[56] References Cited

U.S. PATENT DOCUMENTS

| | | |
|---|---|---|
| 1,953,365 | 4/1934 | Reetz . |
| 2,848,253 | 8/1958 | Walker . |
| 3,396,926 | 8/1968 | Shelton et al. . |
| 3,955,831 | 5/1976 | Whitchurch . |
| 4,256,324 | 3/1981 | Hamilton . |
| 4,657,274 | 4/1987 | Mann et al. . |
| 4,887,831 | 12/1989 | Edwards . |
| 5,016,898 | 5/1991 | Works et al. . |
| 5,028,067 | 7/1991 | Madura . |
| 5,104,138 | 4/1992 | Allen . |
| 5,133,572 | 7/1992 | Polito . |
| 5,143,393 | 9/1992 | Meyer ................................ 280/491.1 |
| 5,263,735 | 11/1993 | Mann . |
| 5,322,313 | 6/1994 | Schroeder . |
| 5,342,076 | 8/1994 | Swindall . |
| 5,413,366 | 5/1995 | Gibbons . |
| 5,435,585 | 7/1995 | Chambers ............................ 280/491.1 |
| 5,472,222 | 12/1995 | Marcy . |
| 5,571,270 | 11/1996 | Larkin .................................. 280/491.1 |
| 5,577,751 | 11/1996 | Matthews .............................. 280/415.1 |
| 5,788,258 | 8/1998 | Gill et al. ............................. 280/491.1 |
| 5,860,671 | 1/1999 | Mackeown ........................... 280/491.5 |

OTHER PUBLICATIONS

B&W Turnover Ball Gooseneck Hitch, 4 pages. (Admitted Prior Art).
The Cody Hitch, 5 pages. (Admitted Prior Art).
Buyers G9003 Gooseneck Ball Mount Frame Mounting Kit, Installation Instruction. (Admitted Prior Art).
Buyers G9003 Installation Insert. (Admitted Prior Art).
Buyers 25,000 lb. Gooseneck Retractable Ball Mount Installation Instructions. (Admitted Prior Art).
Curt Manufacturing, Fold–Down Hitch Ball, Installation Instructions. (Admitted Prior Art).
Curt Manufacturing, Folding Hitch–Sub Assembly Kit, Installation Instructions. (Admitted Prior Art).
Hillsboro Industries, Inc., The Cody Hitch. (Admitted Prior Art).

*Primary Examiner*—J. J. Swann
*Assistant Examiner*—Michael Cuff
*Attorney, Agent, or Firm*—Leon E. Redman; Lloyd D. Doigan

[57] ABSTRACT

A gooseneck hitch assembly mounted in the load bed of a pick-up truck. The hitch assembly includes a housing mounted in the bed of the truck, and a hitch ball removably mounted in the housing. The housing includes a spring biased cylindrical locking pin for positively locking together the housing and hitch ball against separation. The cylindrical pin is manually movable to either a locking position wherein the hitch ball is locked in the housing or to an unlocked position whereby the hitch ball can be readily removed from the housing.

22 Claims, 6 Drawing Sheets

POSITIVE LOCK GOOSENECK HITCH

RELATED APPLICATIONS

This application claims priority from U.S. Provisional Application No. 60/029,822 filed on Oct. 28, 1996.

FIELD OF THE INVENTION

This invention relates to hitch assemblies for vehicles and more particularly to trailer hitch assemblies for use with the load or cargo bed of a towing vehicle such as a pick-up truck.

BACKGROUND OF THE INVENTION

The design and construction of a towing hitch for use with the load bed of a vehicle presents certain problems such as the amount of weight that can be towed and the installation of the hitch. Hitches including a hitch ball which is mounted approximately over the rear axle of a flat bed of a vehicle such as a pick-up truck are known. By placing the hitch ball above the rear axle the towed weight is increased over vehicles having a rear end type hitch. In order to allow the towed vehicle to be connected to this type of hitch a gooseneck type extension is utilized on the towing arm of the towed vehicle. The gooseneck is generally somewhat curved with the hitch portion being disposed at the forward end thereof and with the central portion thereof extending upwardly and over the rear of the towing vehicle.

The placement of the hitch ball in the cargo bed of the towing pick-up truck adversely affects the normal use of the cargo bed when the truck is not being used to pull a towed vehicle. In order to overcome this disadvantage there are known a number of hitches in which the hitch ball can be selectively removed from the hitch, thereby allowing normal use of the cargo bed when the pick-up truck is not being used to tow a vehicle such as a trailer. Such removable ball hitches can have certain problems such as the ball coming loose under certain circumstances and difficulties encountered while mounting or removing the ball from the hitch.

U.S. Pat. No. 5,016,898 discloses a hitch assembly including a removable ball. The ball is secured to the hitch assembly by a spring loaded locking pin that is activated by a lever through the wheel well of a truck. The lever is pulled and locked open from outside the truck, from inside the truck bed the ball is removed, turned over and reinstalled in the same opening in the hitch assembly. The pin is reinstalled through the ball from outside the truck. This requires the operator to activate the releasing mechanism from outside the truck at the wheel opening, then get inside the truck bed to remove the ball and reposition it, and then return to the wheel opening to engage the release mechanism locking the ball into position.

U.S. Pat. No. 5,472,222 discloses a horizontal groove cut into the body portion of the ball. The horizontal groove is tapered and intersects a vertical groove. The vertical groove in the body portion of the ball is aligned with a pin in the truck mounted hitch and lowered. When the ball bottoms out it is rotated so as to rotate the tapered horizontal groove to lock it into position. This hitch assembly requires the operator to twist and pull on the ball to release or install the ball. The installed position allows for a position in which the ball is retained only by its weight. There is no positive lock unless the ball is twisted into position.

It is an object of the instant invention to provide a gooseneck hitch wherein the ball can be selectively removed from the hitch which is simple, sturdy and economical.

It is another object of this invention to provide a gooseneck hitch with removable hitch ball having a secure positive locking system.

It is still another object of the invention to provide a gooseneck hitch wherein the hitch ball can be removed or installed from inside the truck bed in a single operation.

SUMMARY OF THE INVENTION

A gooseneck hitch assembly for the bed of vehicles such as pick-up trucks. The hitch assembly has a removable hitch ball which can be removed and installed from inside the bed of the truck. The hitch assembly of the instant invention provides positive and secure locking of the hitch ball in a retention sleeve in the housing.

The hitch ball includes a ball element connected by an integral neck to a cylindrical stem. The stem is receivable in a hollow cylindrical retention sleeve which is part of the trailer hitch assembly housing. The cylindrical stem is secured within the retention sleeve by inserting the stem into the sleeve and rotating the stem to align a horizontally extending opening, for example a bore therein with a pair of aligned openings on opposite sides of the side wall of the retention sleeve. A locking pin is then extended through said pair of aligned openings on opposite sides of the side wall of the retention sleeve and through said horizontal bore extending through the cylindrical stem.

The locking pin is manipulated from its open to its closed position by a handle attached to the pin and extending perpendicularly thereto. A flat, rectangular shaped plate forms the top of the housing and has a slot extending therethrough. The slot has a longitudinal section and a lateral section extending from said longitudinal section at an acute angle. The handle of the locking pin extends through said slot. When the locking pin and, therefore, the handle are moved to the closed or inserted position with the locking pin extending through the openings in the side wall of the retention sleeve and through the horizontal bore in the stem a compression spring over the locking pin is compressed between the handle and the side wall of the retention sleeve. The compressed spring biases the locking pin toward the open or withdrawn position. If the handle is inserted into the angled, lateral section of the slot it will be forced toward the end of this section of the slot wherein it is in a locked position. Since the handle is fixedly attached to the retention pin movement of the handle in the lateral section of the slot will cause rotation of the locking pin, which is and remains in the closed position extending through the openings in the side wall of the retention sleeve and the bore in the stem, and consequent change in the position of the handle from a vertically extending position toward a horizontally extending position. This removes the interference that would be caused by the handle in its vertically extending position with the trailer coupler and allows the coupler to be attached to the hitch ball. The coupler cannot be attached with the handle in the vertical position.

DESCRIPTION OF THE PREFERRED EMBODIMENT

Figure 1:
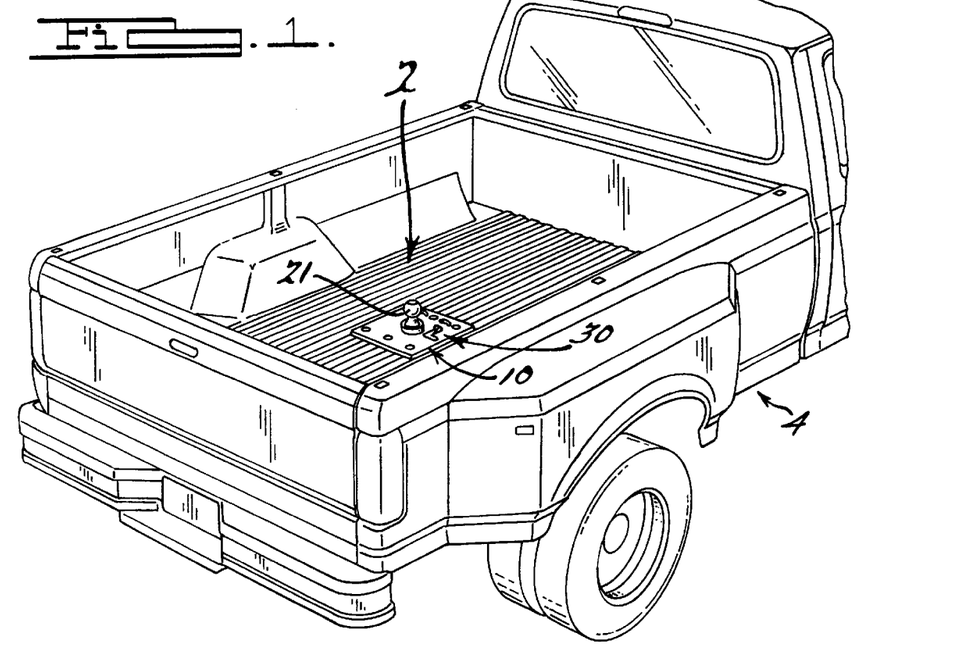
FIG. 1 is a partial top perspective view of the gooseneck hitch assembly of the present invention mounted in the load bed of a vehicle such as a conventional pick-up truck.

As illustrated in FIG. 1 the gooseneck hitch assembly 10 of the instant invention is installed through the load bed 2 of a vehicle such as a pick-up truck. It is mounted approximately over the rear axles of the vehicle. The hitch assembly 10 comprises a mount or housing 30 and a trailer hitch ball 20. The trailer hitch ball 20 is removably mounted in the housing 30.

Figure 2:
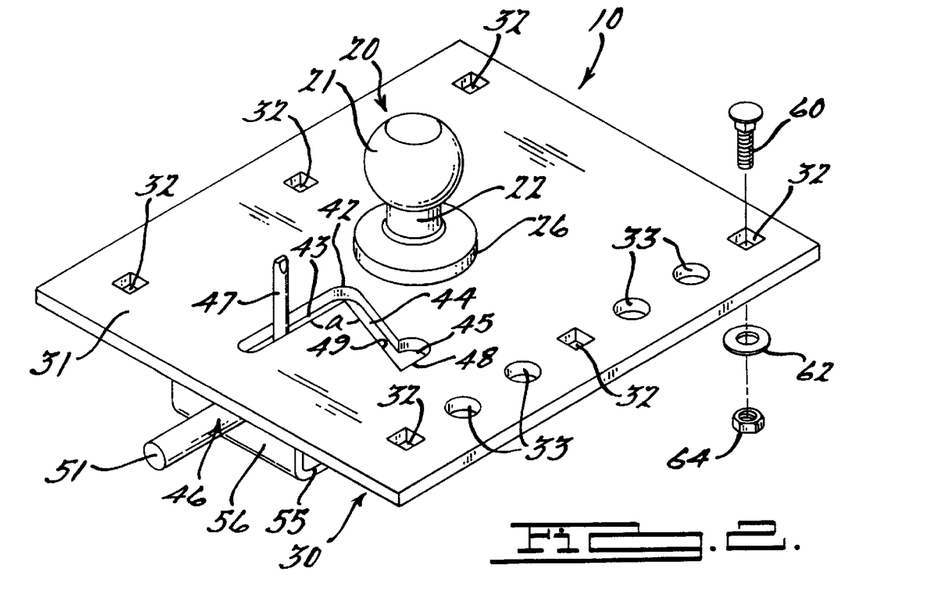
FIG. 2 is a top perspective view of the gooseneck hitch assembly.

The housing 30 includes a generally rectangular shaped trailer hitch supporting plate 31 with a generally cylindrical retention sleeve 34 depending downwardly and generally vertically beneath plate 31. Retention sleeve 34 is open at its top end and is in communication with the outside via generally circular opening 38 in plate 31.

Figure 7:
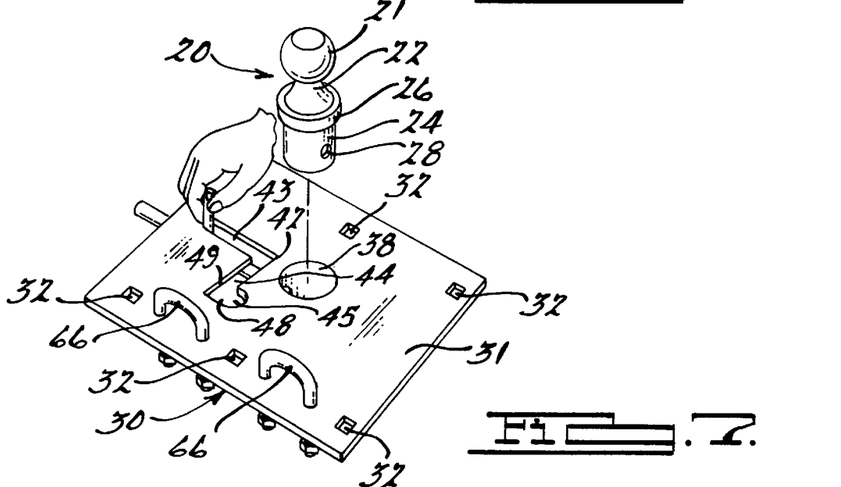
FIG. 7 is an exploded view of the gooseneck hitch assembly showing the locking pin handle and the locking pin in a fully retracted or open position.

The sleeve 34 receives trailer hitch ball 20. Trailer hitch ball 20 includes a ball element 21 connected by an integral neck 22 to a cylindrical stem 24. The cylindrical stem 24 defines at its top end a flanged portion 26 of larger diameter than the cylindrical stem 24. The cylindrical stem 24 has a diameter sized to pass through generally circular opening 38 in plate 31 and to slidably and rotatably fit into hollow interior of cylindrical retention sleeve 34. The flanged portion 26 has a greater diameter than opening 38 and seats against supporting plate 31. Cylindrical stem 24 has a horizontally extending bore 28 passing therethrough. With the stem 24 inserted into sleeve 34 stem 24 is rotated until bore 28 is aligned with generally circular apertures 36, 37 in side wall 35 of retention sleeve. Apertures 36, 37 are opposite each other and are displaced one from the other 180°.

Figure 8:
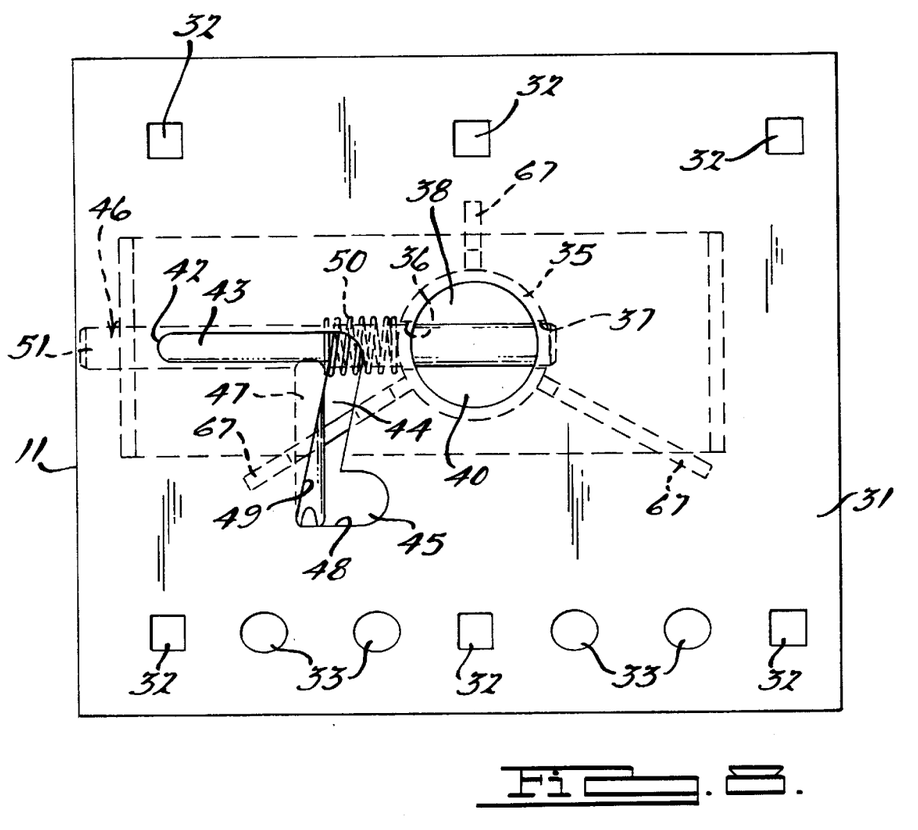
FIG. 8 is a top plan view partially in section with the hitch ball removed and the locking pin in a fully closed or inserted position.
Figure 9:
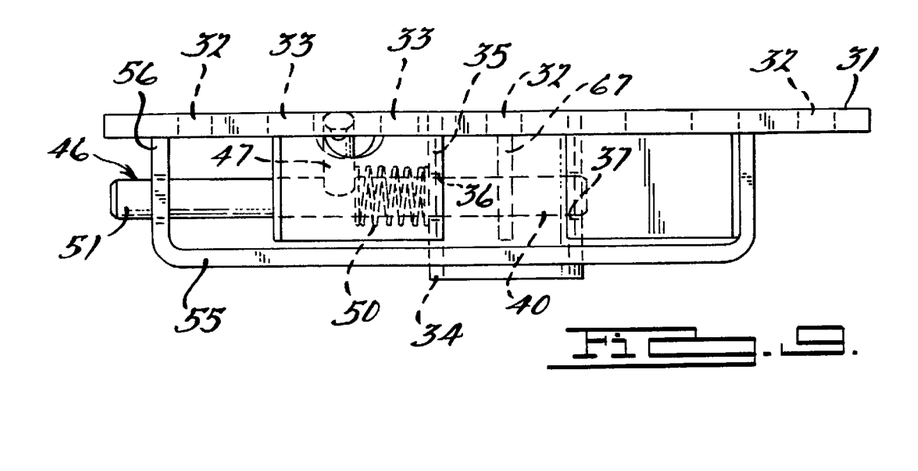
FIG. 9 is a front elevational view partially in section with the hitch ball removed and the locking pin in a fully closed or inserted position as shown in FIG. 8.

As best illustrated in FIGS. 3–6, 8 and 9 a locking pin 46 is of a diameter to fit in the apertures 36, 37 in the side wall 35 of retention sleeve 34 and in the horizontally extending bore 28 in cylindrical stem 24. When the trailer hitch ball is inserted into housing 30, more particularly when cylindrical stem 24 is disposed in retention sleeve 34 with apertures 36, 37 and horizontally extending bore 28 aligned, then locking pin 46 can be inserted through apertures 36, 37 and bore 28 thereby locking the stem 24 and, therefore, the trailer hitch ball to the retention sleeve 34 and, therefore, the housing 30. Such a situation, with the locking pin 46 in the fully inserted or closed position extending through apertures 36, 37 in the side wall of retention sleeve 34, is illustrated in FIGS. 8 and 9.

The locking pin 46 is resiliently urged out of seated engagement with apertures 36, 37 and horizontal bore 28 by biasing means such as compression spring 50. Compression spring 50 is positioned between side wall 35 and handle 47 of locking pin 46. To insert locking pin 46 into apertures 36, 37 and bore 28 to lock trailer hitch ball 20 in housing 30 pin 46 must be pushed against the biasing force of spring 50. As discussed infra spring 50 also functions to provide secure locking of the locking pin 50.

An underframe 55 is secured, as by welding, underneath plate 31. Underframe 55 has a guide hole 57 in upwardly extending vertical portion or wall 56. Guide hole 57 serves to support and guide the front end 40 of locking pin 46.

Figure 11:
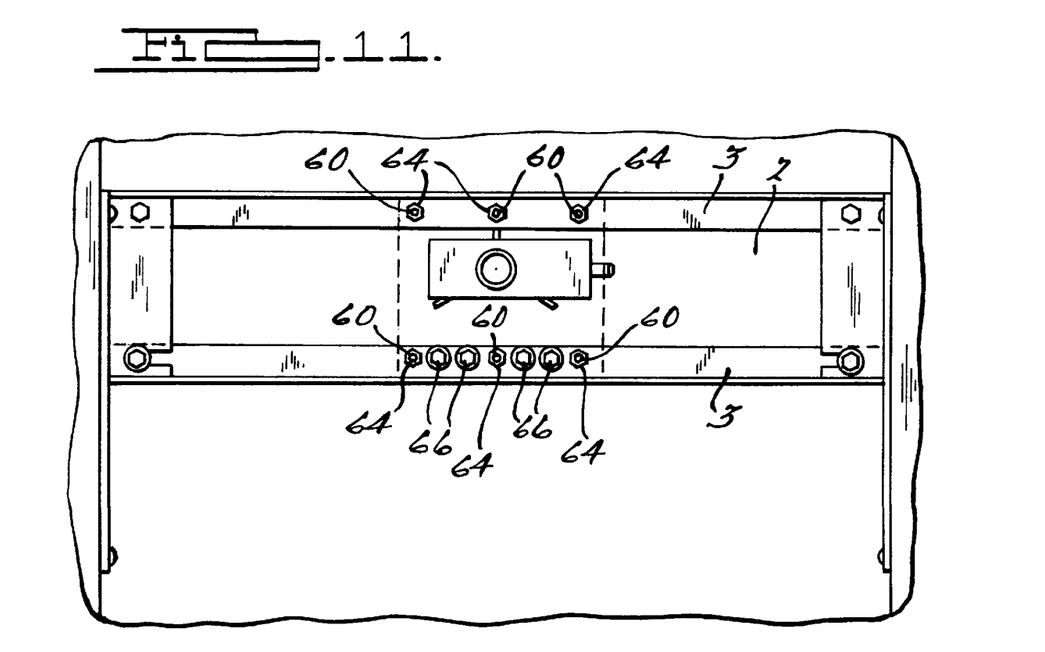
FIG. 11 is a fragmented bottom plan view of the gooseneck hitch assembly mounted in the load bed of a vehicle such as a pick-up truck as shown in FIG. 1.

The plate 31 has a plurality of square apertures 32 adjacent both sides thereof. Apertures 32 receive bolts 60. As best illustrated in FIG. 11 the plate 31 is secured to the frame 3 of the pick-up truck via bolts 60, washers 62 and nuts 64. The plate 31 also has a plurality of round apertures 33 adjacent one side of the plate 31. Round apertures 33 receive U-bolts 66 for securing safety chains (not shown) as is well known in the art.

Plate 31 has a slot 42 therein. Handle 47 extends through slot 42. Slot 42 is generally L-shaped and has a longitudinally extending portion 43 and a laterally extending portion 44. As best seen in FIGS. 2 and 8 portion 44 is angled with respect to portion 43 and forms an acute angle a with portion 43.

Figure 12:
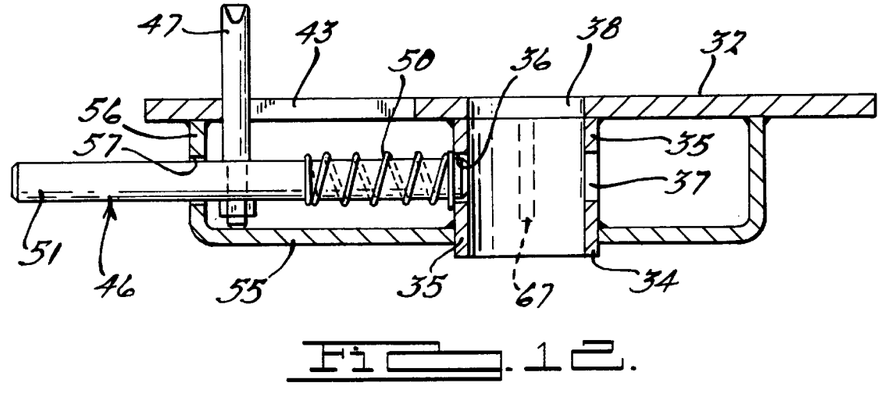
FIG. 12 is a view similar to FIG. 6 except with the locking pin in a fully withdrawn or open position.

In order to lock and secure the trailer hitch ball 20 in the retention sleeve 34 the stem 24 is inserted into the retention sleeve 34 through circular opening 38 in plate 31 with the locking pin in a fully retracted position as illustrated in FIGS. 7 and 12.

Figure 10:
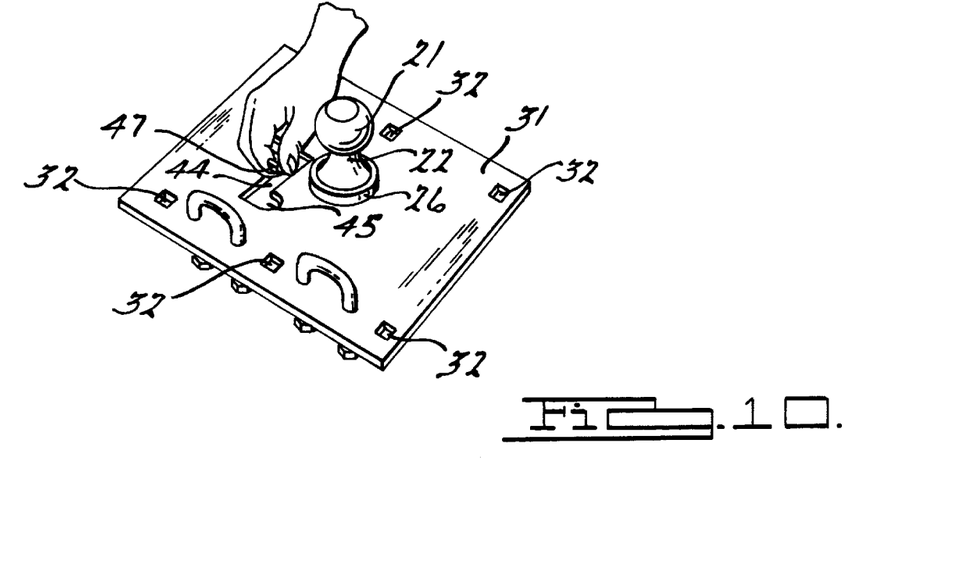
FIG. 10 is a top perspective view with the locking pin handle being moved toward a locked position with the locking pin being in a fully closed or inserted position.

The stem 24 is then rotated in retention sleeve 34 to align horizontally extending bore 28 with apertures 36, 37 in side wall 35. The locking pin 46 is then moved toward the inserted or closed position (to the right in FIGS. 3–6) by moving the handle 47 in portion 43 of slot 42 to the right in FIGS. 2, 3 and 7. The locking pin 46 will extend through aperture 36 in wall 35 and be partially inserted in horizontally extending bore 28 in stem 24 as shown in FIGS. 3–6. Upon further movement of handle 47 and locking pin 40 to the right the locking pin 40 will extend all the way through aperture 36 and bore 28 and will extend into and through aperture 37 (see FIGS. 8 and 9). At this stage the locking pin 46 is in the fully closed or inserted position and the handle 47 is fully to the right in section 43 of slot 42. To lock the locking pin 46 in place the handle 47 is moved toward the end 48 of section 44 of slot 42 (as illustrated in FIG. 10) adjacent finger insertion opening 45 as illustrated in FIG. 8. With the handle 47 abutting the wall 49 of section 44 of slot 42 the locking pin 40 cannot be moved out of engagement with apertures 36, 37 and bore 28 due to the leftward (FIG. 8) biasing force of spring 50, commonly referred to as a toggle function.

To remove the locking pin from apertures 36, 37 and bore 28 the handle is moved out of section 44 of slot 42 and into section 43 and then to the left in section 43. The force of spring 50 is generally sufficient to move locking pin 40 at least partially out of engagement with apertures 36, 37 and bore 28 once handle 47 is moved out of generally laterally extending section 44 and into longitudinally extending section 43 of slot 42.

FIG. 12 illustrates the locking pin 46 in a fully retracted or open position. In this position the hitch ball 20, more particularly the stem 24, can be inserted or removed from retention sleeve 34. As illustrated in FIG. 12 the handle 47 is adjacent the end or rear of longitudinally extending section 43 of slot 42 and the front portion of pin 46 is withdrawn from the hollow interior of retention sleeve 34. As best illustrated in FIGS. 9 and 12 the locking pin 46, in both its open or withdrawn position and in its closed or inserted position, is supported by side wall 35 of retention sleeve 34 and vertical wall 56 of underframe 55. More specifically, as shown in FIG. 12, the front portion 40 of locking pin 46 extends through aperture 36 and is supported by wall 35 while the rear portion 51 of pin 46 extends through guide hole 57 and is supported by wall 56.

The locking pin 46 cannot accidentally fall out of the housing 30 because it is prevented from falling out laterally by being mounted in aperture 36 and guide hole 57, and it is prevented by falling out longitudinally by handle 47 being located in slot 42. The front portion 40 of pin 46 cannot be removed from aperture 36 because of handle 47 abutting the rear end of longitudinal portion 43 of slot 42 (see FIG. 12).

The finger insertion opening 45 allows one to insert the fingers and easily grasp handle 47 when it is in the fully locked position in section 44 of slot 42 and in a down or flat position as illustrated in FIGS. 8 and 9.

Since the handle 47 is attached to locking pin 40, movement of handle 47 in slot 44 of section 42 causes a rotation of locking pin 46. This rotation of the locking pin 40 causes the handle 47 to pivot from its generally vertically extending position when in section 43 (as illustrated in FIGS. 2 and 7) toward a generally horizontal position and to lie substantially even with the top surface of plate 31 when it is in the angled laterally extending section 44 (as illustrated in FIGS. 8 and 10). If the handle 47 is not moved to the end 48 of section 44 of slot 42 it will not lie more horizontally or flat and will not be substantially even or flush with the top of plate 31, but will extend substantially vertically and will thus create an interference with the trailer coupler which will prevent the coupler from being attached to the hitch assembly when the ball 20 is not securely locked by the locking pin 46.

Figure 3:
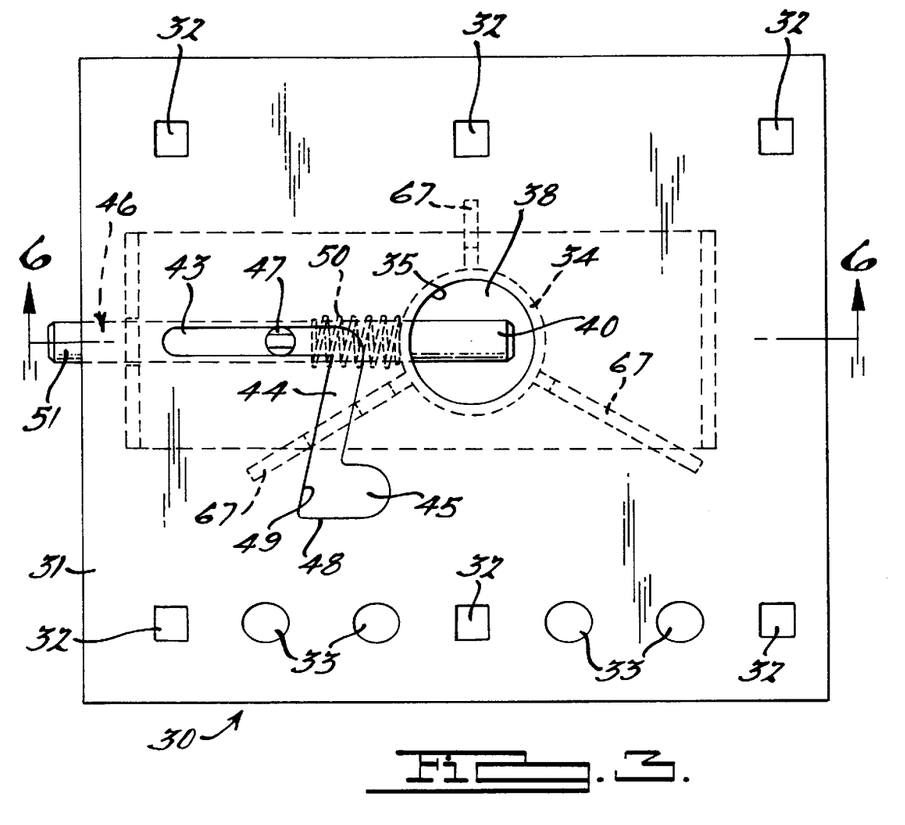
FIG. 3 is a top plan view partially in section with the hitch ball removed and with the locking pin in a partially closed or inserted position.
Figure 4:
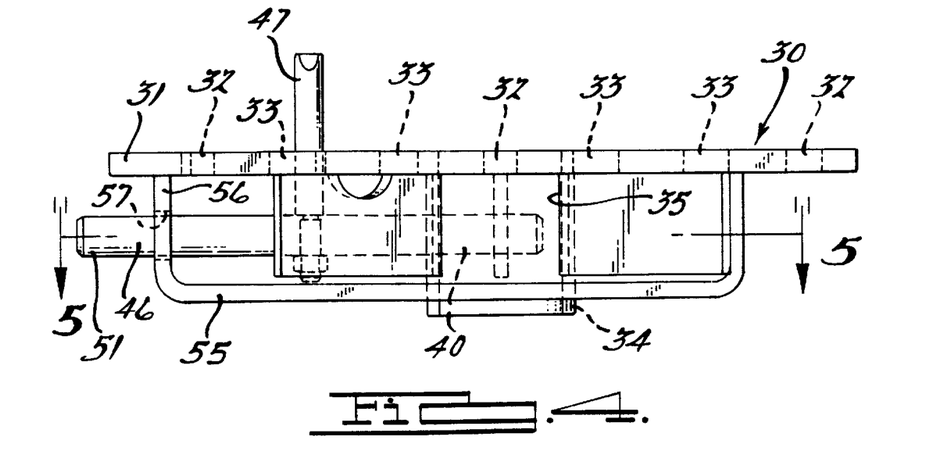
FIG. 4 is a front elevational view partially in section with the hitch ball removed and with the locking pin in a partially closed or inserted position as shown in FIG. 3.
Figure 5:
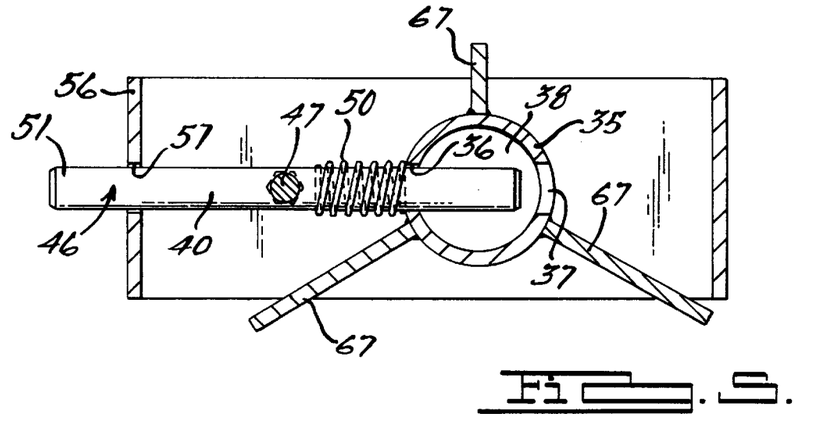
FIG. 5 is a partial cross-sectional view taken along line 5—5 of FIG. 4.
Figure 6:
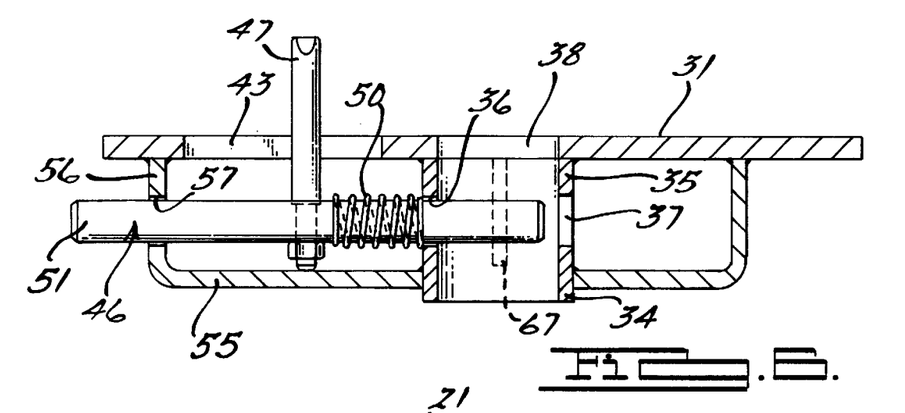
FIG. 6 is a partial cross-sectional view taken along line 6—6 of FIG. 3.

The spring 50 also functions to effect positive, secure locking. Once the handle 47 is in section 44 of slot 42 spring 50 pushes rearwardly or to the left in the figures on locking pin 46. This causes locking pin 46 to move to the rear or to the left in the figures. However, since handle 47 is in section 44 of slot 42, the front section 40 of locking pin 46 cannot move too far to the left but handle 47, abutting against wall 49 of section 44, is forced to move toward end 48 since section 44 is angled toward the rear or the left as best shown in FIGS. 2 and 3. Thus, the rearward, longitudinally acting force exerted by spring 50 on pin 46 is translated into lateral movement of handle 47 in section 44 of slot 42 toward the end 48 of section 44 where the handle will be rotated to lie flat and substantially flush with the top surface of plate 31. This give a toggle like feel to the handle.

The housing 30 also has supports 67 supporting the retention sleeve 34 against the floor of bed 2. The supports 67 are attached, as by welding or are integral with, side wall 35 of retention sleeve 34 and are arranged or disposed in a triangular pattern. "The front section 40 is dimensioned sufficiently long as shown in the drawings not to disengage from the apertures 36 and 37 as the pin 46 moves slightly in the longitudinal direction as the handle is laterally recessed into slot section 43."

The invention has been described in detail with particular reference to preferred embodiments thereof, but it will be understood that variations and modifications can be effected within the spirit and scope of the invention.

What is claimed is:

1. A gooseneck hitch assembly for use in the load bed of a vehicle comprising:

a hitch ball comprising a ball element, a stem element having a bore therethrough, and a neck connecting said ball element to to said stem element; and a housing comprising a generally horizontal flat plate having a slot therein, said slot accessible from the load bed of said vehicle, a generally vertically extending retention sleeve disposed below and affixed relative to said flat plate adapted to removably receive said stem element, said retention sleeve having at least one side wall disposed beneath said flat plate and with at least one sleeve opening extending therethrough, a locking pin adapted to be inserted through said at least one sleeve opening in said side wall and said bore in said stem element to secure said hitch ball and said housing against vertical separation from each other, a handle affixed to said pin and extending out through said slot such that said handle is accessible from above said flat plate, with said locking pin movable into and out of engagement with said at least one sleeve opening and said bore along said slot upon manual translation of said handle along said slot.

2. The gooseneck hitch assembly of claim 1 wherein said stem element is generally cylindrical.

3. The gooseneck hitch assembly of claim 1 wherein said bore is generally horizontally extending and extends generally transversely through said stem element.

4. The gooseneck hitch assembly of claim 2 wherein said hitch ball includes a flange on said stem element adjacent said neck, said flange having a greater diameter than said stem element.

5. The gooseneck hitch assembly of claim 1 wherein said plate is generally rectangular in shape.

6. The gooseneck hitch assembly of claim 1 wherein said retention sleeve is generally cylindrical having a hollow interior.

7. The gooseneck hitch assembly of claim 6 wherein said retention sleeve has two aligned sleeve openings disposed opposite each other in the side wall.

8. The gooseneck hitch assembly of claim 1 wherein said slot in said plate has two sections, a first elongated section and a second elongated section in communication with said first section and angled thereto.

9. The gooseneck hitch assembly of claim 8 wherein said second section of said slot is angled to said first section of said slot at an acute angle.

10. A gooseneck assembly as defined in claim 9 wherein said handle being retractable such that it does not extend above the flat plate when said pin is moved into engagement with said sleeve and said stem with said pin being normally biased to the disengaged position such that the acute angle provides toggle like action for the pin moving into and out of engagement with said sleeve and stem.

11. A gooseneck assembly as defined in claim 10 wherein said handle, when in a position corresponding to the pin not being fully engaged with the sleeve and ball, interferes with the placement of a coupler onto said ball.

12. A gooseneck assembly as defined in claim 8, wherein said handle is retractable such that it does not extend above the flat plate when said pin is moved into engagement with said sleeve and said stem.

13. The gooseneck hitch assembly of claim 6 wherein said plate has a plate opening therethrough in communication with the hollow interior of said retention sleeve.

14. The gooseneck hitch assembly of claim 13 wherein said plate opening through said plate is of substantially the same diameter as said hollow interior of said retention sleeve.

15. The gooseneck hitch assembly of claim 14 wherein said stem of said hitch ball is generally cylindrical and is sized to fit into said hollow interior of said retention sleeve, and wherein said hitch ball includes a flange on said stem adjacent said neck, said flange having a larger diameter than said stem and said opening in said plate.

16. The gooseneck assembly of claim 1 having a spring around said locking pin between said side wall of said retention sleeve and said handle, said spring biasing said pin away from said retention sleeve.

17. The gooseneck hitch assembly of claim 1 which includes means for attaching said assembly to the bed of said vehicle.

18. A gooseneck assembly as defined in claim 1 wherein said handle, when in a position corresponding to the pin not being fully engaged with the sleeve and ball, interferes with the placement of a coupler onto said ball.

19. A gooseneck hitch assembly for use in the load bed of a vehicle comprising:

a hitch ball comprising a ball element, a stem element having a bore extending laterally therethrough, and a neck connecting said ball element to said stem element;

a housing comprising a generally horizontal flat plate having a slot therein, said slot accessible from the load bed of said vehicle, a generally vertically extending retention sleeve disposed below and affixed relative to said flat plate adapted to removably receive said stem element beneath said plate, said retention sleeve having at least one side wall disposed beneath said flat plate with at least one sleeve opening extending therethrough, said at least one sleeve opening alignable with said bore in said stem, a locking pin adapted to be inserted through said at least one sleeve opening in said side wall and said bore in said stem element to secure said hitch ball to said housing against vertical separation from each other, a handle affixed to said pin and extending out through said slot such that said handle is accessible from above said flat plate and translatable along said slot with said locking pin moveable into and out of engagement with said at least one sleeve opening in said side wall and said bore upon translation of said handle along said slot;

said slot in said plate is comprised of two sections, a first elongated section and a second elongated section in communication with said first section and angled thereto;

said second section of said slot is angled to said first section at an acute angle; and a spring around said pin for biasing said pin away from said side wall such that said spring provides a toggle action for the handle moving along the respective first and second elongated sections of said slot.

20. The gooseneck hitch assembly of claim 19 wherein said spring is disposed intermediate said at least one side wall of said retention sleeve and said handle, and biases said pin away from said retention sleeve.

21. A gooseneck hitch assembly for use in a load bed of a vehicle comprising:

a hitch ball comprising a ball element and a stem having an opening therein;

a housing comprising a generally horizontal flat plate with a plate opening therethrough sized to receive the stem element of the hitch ball;

a retention sleeve depending from the flat plate below said plate opening, said retention sleeve having a sleeve opening alignable with said opening in said stem;

said housing having a slot through the horizontal flat plate;

a locking pin movably connected to said housing under said flat plate to be selectively engageable with said respective openings in said sleeve and stem to secure said ball to said housing;

a handle laterally extending from said locking pin and extendable through said slot for being manually operable from above said flat plate; and said handle being retractable into said slot when said pin is selectively engaged with said respective openings in said sleeve and stem.

22. A gooseneck assembly as defined in claim 21 wherein said handle, when in a position corresponding to the pin not being fully engaged with the sleeve and ball, interferes with the placement of a coupler onto said ball.

* * * * *